(12) United States Patent
Haraguchi et al.

(10) Patent No.: US 7,365,120 B2
(45) Date of Patent: Apr. 29, 2008

(54) POLYMER COMPOSITE, STRETCHED PRODUCT THEREOF AND PRODUCTION PROCESSES THEREFOR

(75) Inventors: Kazutoshi Haraguchi, Chiba (JP); Toru Takehisa, Chiba (JP); Makiko Ebato, Yachiyo (JP)

(73) Assignee: Kawamura Institute of Chemical Research, Sakura-Shi (JP)

( * ) Notice: Subject to any disclaimer, the term of this patent is extended or adjusted under 35 U.S.C. 154(b) by 630 days.

(21) Appl. No.: 10/825,202

(22) Filed: Apr. 16, 2004

(65) Prior Publication Data

US 2005/0234179 A1    Oct. 20, 2005

(51) Int. Cl.
*C08K 3/34*   (2006.01)
*C08K 9/00*   (2006.01)

(52) U.S. Cl. ...................................... 524/445; 523/216
(58) Field of Classification Search ................ 524/445; 523/216
See application file for complete search history.

(56) References Cited

U.S. PATENT DOCUMENTS

| 6,759,463 B2 | 7/2004 | Lorah et al. ................ 524/445 |
| 2002/0055581 A1* | 5/2002 | Lorah et al. ................ 524/445 |
| 2002/0058739 A1 | 5/2002 | Lorah et al. ................ 524/445 |

FOREIGN PATENT DOCUMENTS

JP    63028639 A  *  2/1988

OTHER PUBLICATIONS

European Search Report dated Nov. 24, 2004.
K. Haraguchi, et al.; "The preparation and characterization of hybrid materials composed of phenolic resin and silica"; *Journal of Materials Science*; vol. 33; 1998; pp. 3337-3344./Discussed in the specification.
A. Usuki, et al.; "Swelling behavior of montmorillonite cation exchanged for ω-amino acids by ε-caprolactam"; *J. Mater. Res.*; vol. 8; No. 5; May 1993; pp. 1174-1178./ Discussed in the specification.
T.J. Pinnavaia, et al.; "Polymer-Clay Nanocomposites"; *Wiley Series in Polymer Science*; 2000; cover sheet and contents only (9 Sheets)/Discussed in the specification.
K. Haraguchi, et al.; "Effects of Clay Content on the Properties of Nanocomposite Hydrogels Composed of Poly(N-isopropylacrylamide) and Clay"; *Macromolecules*; vol. 35; No. 27; 2002; pp. 10162-10171./Discussed in the specification.

* cited by examiner

*Primary Examiner*—Tae H Yoon
(74) *Attorney, Agent, or Firm*—Kratz, Quintos & Hanson, LLP

(57) ABSTRACT

A polymer composite and a stretched product thereof formed from a three dimensional network structure including an organic polymer (A), comprising either a polymer produced from a water soluble (meth)acrylate ester (a), or a copolymer of a water soluble (meth)acrylate ester (a) and at least one compound selected from a group consisting of (meth)acrylamide and N-substituted (meth)acrylamides (b), and a water swelling clay mineral (B).

4 Claims, No Drawings

POLYMER COMPOSITE, STRETCHED PRODUCT THEREOF AND PRODUCTION PROCESSES THEREFOR

BACKGROUND OF THE INVENTION

1. Field of the Invention

The present invention relates to a polymer composite comprising a three dimensional network structure formed from an organic polymer and a clay mineral, as well as a stretched product thereof, and production processes for such a polymer composite and stretched product.

2. Description of Related Art

Examples of long-known polymer composite materials, produced by complexing an organic polymer with an inorganic material, include materials produced by filling an organic polymer with not only glass fiber and carbon fiber, but also with talc, calcium carbonate or the like. In recent years, significant improvements in mechanical properties and thermal characteristics have been achieved by dispersing and complexing nanometer-scale, ultra-fine inorganic components within organic polymers, and these composite materials are attracting considerable interest as organic-inorganic nanocomposite materials.

The most commonly used inorganic components for these nanocomposite materials are metal oxides synthesized using sol-gel reactions, and clay minerals that can be exfoliated to form sheet-like layers (for example, see K. Haraguchi et al., J. Mater. Sci., 33, 3337-3344 (1998), and A. Usuki et al., J. Mater. Res., 8, 1174-1178 (1993)).

Of the proposed materials, nanocomposite materials that use clay minerals as the inorganic component benefit from the large aspect ratio of the layered clay, enabling good improvements to be achieved in both the mechanical properties and the gas shielding properties of the composite material. In these composites of clay minerals and organic polymers (nanocomposites), achieving a fine dispersion of the clay layers within the organic polymer, and maximizing the interaction between the clay layers and the organic polymer are both important factors. Accordingly, the organic polymer is often modified with maleic anhydride or oxazoline, and rather than selecting an inorganic clay mineral which is cheap but which does not disperse readily within the organic polymer, the clay mineral is often first treated with alkylammonium cations or the like, which widens the distance between layers and promotes easier interlayer exfoliation, and also improves the dispersion properties within organic solvents and organic polymers (whereas untreated clay is described as inorganic clay, this type of treated clay is referred to as organized clay).

Until now, these polymer composite materials known as nanocomposites have been prepared by complexing an organic polymer such as a polyamide, polystyrene, polypropylene, polyimide or polyurethane with organized clay. Because the thus produced polymer composites comprise a fine dispersion of clay layers with a large aspect ratio, improvements in properties such as the elastic modulus, the thermal deformation temperature, the gas permeability, and the burning rate have been reported (for example, see T. J. Pinnavaia and G. W. Beall Eds., Polymer-Clay Nanocomposites, Wiley (published 2000).

From the viewpoint of improving the performance of the polymer composite, larger quantities of clay mineral are desirable, although it is also important to achieve the maximum level of performance improvement with as small a quantity of clay mineral as possible. Based on the research to date, the quantity of clay is typically within a range from 0.2 to 5% by weight, and neither low inorganic content polymer composites with a clay content of less than 0.2% by weight, or particularly less than 0.1% by weight, nor high inorganic content polymer composites with a clay content more than 10% by weight, or particularlly exceeding 15% by weight are currently being used. This is because if the inorganic content becomes too low, then the performance improvements become almost unnoticeable, whereas if the inorganic content is too high, then the viscosity during production increases considerably, which can make it impossible to achieve the required level of nanoscale, ultra-fine, and uniform dispersion in the composite product, the moldability of the composite material deteriorates markedly, which can prevent the uniform molding of a desired shape, and the composite material also becomes more brittle, causing a significant deterioration in the mechanical properties (such as the strength and elongation).

As a result, the development of polymer composites which allow effective improvements in performance even if the clay mineral content is low, and polymer composites which display a uniform, ultra-fine dispersion of the inorganic component and offer superior mechanical properties even if the clay mineral content is high has been keenly sought.

The inventors of the present invention have previously developed a polymer hydrogel comprising a three dimensional network structure of an acrylamide based monomer and a water swelling clay mineral, and have reported that the resulting gel displays a variety of specific properties (American Chemical Society "Macromolecules" 2002, vol. 35, pp 10162 to 10171). This polymer hydrogel displays particularly superior levels of stretchability and strength when compared with conventional hydrogels formed using organic cross linking agents, and is consequently potentially useful, although if the water content falls, then the mechanical toughness deteriorates, and if the water content decreases to substantially zero, then the elongation of the material essentially disappears, resulting in a brittle material.

SUMMARY OF THE INVENTION

An object of the present invention is to provide a polymer composite in which a clay mineral can be uniformly and finely dispersed within an organic polymer across a wide range of clay mineral content values, and yields a composite product which displays superior mechanical properties such as stretchability, strength and elastic modulus, as well as a stretched product of such a polymer composite, and production processes for both the polymer composite and the stretched product.

As a result of intensive research aimed at achieving the above object, the inventors of the present invention discovered that a polymer composite and stretched product thereof comprising a three dimensional network structure formed from an organic polymer (A) comprising either a polymer of a water soluble (meth)acrylate ester (a), or a copolymer of a water soluble (meth)acrylate ester (a) and at least one compound selected from a group consisting of (meth)acrylamide and N-substituted (meth)acrylamides (b); and a water swelling clay mineral (B) displayed excellent uniform dispersibility of the clay mineral across a wide range of clay mineral content values, and compared with the equivalent polymer or copolymer containing no clay mineral, displayed a marked increase in the mechanical properties such as the stretchability and the strength, and they were thus able to complete the present invention.

In other words, the present invention provides a polymer composite comprising a three dimensional network structure formed from an organic polymer (A) comprising either a polymer produced from a water soluble (meth)acrylate ester (a), or a copolymer of a water soluble (meth)acrylate ester (a) and at least one compound selected from a group consisting of (meth)acrylamide and N-substituted (meth)acrylamides (b); and a water swelling clay mineral (B), as well as a polymer composite stretched product produced by stretching the above polymer composite.

In this specification and claims, "(meth)acrylate ester" is a general term for acrylate ester and methacrylate ester, and "(meth)acrylamide" is a general term for acrylamide and methacrylamide.

The present invention also provides a production process for a polymer composite or a stretched product thereof, comprising the steps of dissolving or uniformly dispersing a water swelling clay mineral (B), a water soluble (meth)acrylate ester (a), a polymerization initiator, and where necessary a catalyst and/or an organic cross linking agent (C) in either water or a mixed solvent of water and an organic solvent; polymerizing the component (a); conducting drying to remove the solvent; and performing or not performing a subsequent stretching treatment. Furthermore, the present invention also provides a production process for a polymer composite or a stretched product thereof, comprising the steps of dissolving or uniformly dispersing a water swelling clay mineral (B), at least one compound selected from a group consisting of (meth)acrylamide and N-substituted (meth)acrylamides (b), a water soluble (meth)acrylate ester (a), a polymerization initiator, and where necessary a catalyst and/or an organic cross linking agent (C) in either water or a mixed solvent of water and an organic solvent; copolymerizing the component (a) and the component (b); conducting drying to remove the solvent; and performing or not performing a subsequent stretching treatment.

DETAILED DESCRIPTION OF THE INVENTION

A polymer composite according to the present invention comprises a three dimensional network structure formed from an organic polymer (A) comprising either a polymer produced from a water soluble (meth)acrylate ester, or a copolymer of a water soluble (meth)acrylate ester and at least one compound selected from a group consisting of (meth)acrylamide and N-substituted (meth)acrylamides (hereafter the abbreviated term "organic polymer (A)" is used); and a water swelling clay mineral (B), and the water swelling clay mineral, which is capable of sheet-like layer exfoliation, can be incorporated uniformly or with some kind of uniform superstructure, within the organic polymer across a wide range of content values, yielding a polymer composite that displays excellent mechanical properties such as stretchability and flexibility.

The water soluble (meth)acrylate ester, (meth)acrylamide and N-substituted (meth)acrylamide used in the present invention are preferably soluble in either water or a mixed solvent of water and an organic solvent. In contrast, the organic polymer (A) produced by either polymerization or copolymerization of these monomers preferably has a large hydrophobicity, and is preferably insoluble in water and undergoes little swelling without excessive water absorption, but rather exists in water in a stable state. In other words, although a polymer composite of the present invention is synthesized using a water soluble monomer or monomers and a water swelling clay mineral as the primary reactants, the product polymer composite is preferably a highly hydrophobic material with low levels of water swelling. In order to alter the balance between hydrophilicty and hydrophobicity for the polymer composite, and strengthen interactions with other components, hydrophilic groups, ionic groups and/or hydrophobic groups can also be introduced into the polymer or copolymer as required.

The water soluble (meth)acrylate ester (a) is a compound that is essentially soluble in water, and which during polymerization forms a three dimensional network structure with the water swelling clay mineral (B). Suitable examples of the (meth)acrylate ester (a) include methoxyethyl acrylate, ethoxyethyl acrylate, methoxyethyl methacrylate and ethoxyethyl methacrylate. The polymer produced from a (meth)acrylate ester (a) of the present invention includes both polymers produced from a single monomer selected from these (meth)acrylate esters, and copolymers produced from a plurality of monomers.

Examples of the (meth)acrylamide or N-substituted (meth)acrylamide used in the present invention include (meth)acrylamide, and alkyl(meth)acrylamides with an alkyl group of at least 1 carbon atom, such as N-methylacrylamide, N-ethylacrylamide, N-cyclopropylacrylamide, N-isopropylacrylamide, N,N-dimethylacrylamide, N-methyl-N-ethylacrylamide, N-methyl-N-isopropylacrylamide, N-methyl-N-n-propylacrylamide, N,N-diethylacrylamide, N-ethyl-N-isopropylacrylamide, N-ethyl-N-n-propylacrylamide, N-acryloylpyrrolidine, N-acryloylpiperidine, N-acryloylmorpholine, N-acryloylmethylhomopiperazine, N-acryloylmethylpiperazine, and N-methylmethacrylamide.

In those cases in which the organic polymer (A) comprises a copolymer of a water soluble (meth)acrylate ester (a) and at least one compound selected from a group consisting of (meth)acrylamide and N-substituted (meth)acrylamides (b), the molar ratio of the component (b) relative to the component (a) in the copolymer is preferably no more than 1, in order to ensure maintenance of the room temperature toughness of the product polymer composite while improving the hardness and elastic modulus. In order to produce polymer composites with good flexibility at room temperature and a low level of water absorption, the above molar ratio is preferably no more than 0.5, and even more preferably no more than 0.25.

There are no particular restrictions on the glass transition temperature of the organic polymer (A), and polymers with a wide range of glass transition temperatures can be used, although in terms of workability and achieving favorable stretchability and flexibility at room temperature, the glass transition temperature of the organic polymer (A) is preferably no more than 100° C., and even more preferably no more than 30° C., and most preferably no more than 0° C.

A swelling clay mineral that can be exfoliated to form sheet-like layers is used as the water swelling clay mineral (B), and of such materials, clay minerals capable of swelling and forming a uniform dispersion in either water or a mixed solvent of water and an organic solvent are preferred, and clay minerals capable of swelling and forming a uniform dispersion in water that is either at, or near, the molecular level (for a single layer) are particularly desirable. Examples of suitable water swelling clay minerals include water swelling smectite or water swelling mica, and specific examples include water swelling hectorite, water swelling montmorillonite, water swelling saponite or water swelling synthetic mica containing sodium as interlayer ions.

The polymer composite of the present invention is produced either by dissolving or uniformly dispersing the water swelling clay mineral (B), the water soluble (meth)acrylate ester (a), a polymerization initiator, and where necessary a catalyst and/or an organic cross linking agent (C) in either water or a mixed solvent of water and an organic solvent; and then polymerizing the component (a), or by dissolving or uniformly dispersing the water swelling clay mineral (B), at least one compound selected from a group consisting of (meth)acrylamide and N-substituted (meth)acrylamides (b), the water soluble (meth)acrylate ester (a), a polymerization initiator, and where necessary a catalyst and/or an organic cross linking agent (C) in either water or a mixed solvent of water and an organic solvent, and then copolymerizing the component (a) and the component (b), and in either case subsequently conducting a drying treatment to remove the solvent, and then performing a stretching treatment where required.

The temperature for the stretching treatment is preferably less than the Tg value for the organic polymer (A), and is most preferably room temperature. Furthermore, the stretch ratio is less than the elongation at break of the polymer composite, but preferably at least 2-fold, and even more preferably at least 5-fold, and most preferably 10-fold or greater.

In a sample process, an aqueous solution is first prepared by forming a uniform, ultra-fine dispersion of the water swelling clay mineral (B) in either water or a mixed solvent of water and an organic solvent, and one or more water soluble (meth)acrylate esters (a), or alternatively a mixture of a (meth)acrylate ester (a) and at least one compound selected from a group consisting of (meth)acrylamide and N-substituted (meth)acrylamides, is added to the aqueous solution and dissolved. Subsequently, a polymerization initiator is added, a catalyst and/or an organic cross linking agent are added where necessary, and an in-situ radical polymerization is conducted in the presence of the water swelling clay mineral (B), with additional heating or electron beam irradiation or the like used as required. The product is dried to remove the solvent, and, where required, is then stretched, yielding a polymer composite of the present invention.

The polymerization initiator and catalyst can be appropriately selected from conventional radical polymerization initiators and catalysts. Materials which display good water dispersibility and can be uniformly dispersed through the entire reaction system are preferred. Specific examples of suitable polymerization initiators include water soluble peroxides such as potassium peroxodisulfate and ammonium peroxodisulfate, water soluble azo compounds such as VA-044, V-50 and V-501 (all manufactured by Wako Pure Chemical Industries Ltd.), and mixtures of $Fe^{2+}$ and hydrogen peroxide.

An example of a suitable catalyst is the tertiary amine compound N,N,N'N'-tetramethylethylenediamine. It should be noted that a catalyst need not necessarily be used. The polymerization temperature should be selected in accordance with the selected polymerization catalyst and the polymerization initiator, and is typically within a range from 0 to 100° C. The length of the polymerization reaction may be any time within a range from several dozen seconds to several dozen hours.

As the organic cross linking agent, conventional polyfunctional organic cross linking agents can be used, and a typical representative example is N,N'-methylenebisacrylamide.

In a polymer composite of the present invention, the organic polymer (A) and the water swelling clay mineral (B) interact to form a three dimensional network structure. The actual form of the interaction may comprise one or more of ion bonding, hydrogen bonding, hydrophobic bonding, coordinate bonding or covalent bonding, and there are no particular restrictions provided an effective three dimensional network structure is formed. Immediately following synthesis, the composite still contains a significant quantity of water, and the water content (the weight % relative to the weight of the polymer composite solid fraction, this definition also applies to subsequent water content values) is typically within a range from 200 to 800% by weight, meaning the composite often displays poor initial strength. By drying the newly synthesized polymer composite and reducing the water content to no more than 100% by weight, and preferably no more than 50% by weight, and even more preferably no more than 20% by weight, the interaction between the organic polymer (A) and the water swelling clay mineral (B) is strengthened significantly, yielding a polymer composite with superior mechanical properties. When a polymer composite that has already been dried is re-immersed in water, the composite does whiten to some extent, although the whitening is uniform, and there is no significant swelling, nor marked deterioration in strength.

Provided the formation of the three dimensional network structure is not inhibited, or indeed in order to promote the formation of the three dimensional network structure, other polymerizable organic molecules may be added together with the polymer components used for forming the organic polymer (A), or other organic or inorganic functional molecules or particles may be added to the product polymer composite in order to impart specific functions.

In the present invention, the formation of the polymer composite three dimensional network structure must be conducted using a water swelling clay mineral, and the three dimensional network structure can be formed solely through the action of the water swelling clay mineral, without the use of any normal organic cross linking agents. Forming the network structure without the use of organic cross linking agents is particularly preferred, although in some cases, depending on the monomers and/or the reaction conditions selected, or the mechanical properties that are being targeted, addition of an organic cross linking agent may also be required. In those cases where no clay mineral is used, namely cases in which only a linear polymer is used, or cases in which only an organic cross linking agent is used for cross linking, the resulting material displays poor mechanical properties, including the very low levels of stretchability and strength. If an organic cross linking agent is used in combination with the water swelling clay mineral, then a polymer composite with a modified elastic modulus and a controlled level of stretchability can be produced. Specifically, by also adding an organic cross linking agent, the stretchability can be reduced while the elastic modulus is increased. There are no particular restrictions on the quantity added of the organic cross linking agent, provided it is effective in achieving the desired control of the mechanical properties, although the quantity is typically no more than 2 mol %, and preferably no more than 1 mol %, and even more preferably no more than 0.5 mol %, relative to the quantity of monomer(s).

In a polymer composite of the present invention, the weight ratio of the water swelling clay mineral (B) relative to the organic polymer (A) is preferably within a range from 0.003 to 3, and even more preferably from 0.005 to 2, and most preferably from 0.01 to 1. If this weight ratio is less than 0.003, then the mechanical properties of the product polymer composite are likely to prove unsatisfactory, whereas if the weight ratio exceeds 3, then uniform ultra-fine dispersion of the clay mineral becomes difficult.

Biologically compatible materials may also be incorporated within polymer composites of the present invention. Examples of these biologically compatible materials include materials that exist in a stable state within the polymer composite gel, materials that undergo controlled release from the gel, and materials that bleed out through the gel surface. Suitable materials include those that are non-toxic to biological organisms, and particularly to humans, and preferably materials that exhibit some type of physiological activity, materials that are absorbed by biological organisms, materials that assist the activity or growth of biological organisms, or materials that exhibit some type of healing action. Furthermore, these biologically compatible materials may be either dispersed at the molecular level within the gel, or may exist as fibers or ultra-fine particles within the gel. Materials that display at least some affinity for water or aqueous solutions are preferred, and materials that are either soluble or capable of forming ultra-fine dispersions in water are particularly preferred.

Specific examples of such biologically compatible materials include proteins that display biological absorption or biological affinity such as oligopeptides, polypeptides, glycoproteins, lipoproteins, protein phosphates, amylase, protease, lipase, cellulase, oxidase and dehydrogenase, cytokine, monoclonal antibodies, polyclonal antibodies, insulin, glucagon, oxytocin, vasopressin, secretin, ACTH, gelatin, collagen, fibrinogen, and gluten; as well as DNA, cellulose materials such as carboxymethylcellulose, polysaccharides such as heparin, esters of polymalic acid or poly-$\beta$-hydroxy-butyric acid, other biological polymers such as polylactic acid, lower molecular weight materials such as sugars and amino acids, hydroxyapatite, metal oxides such as silica, titania and zirconia, and other biologically compatible inorganic substances such as titanium.

The preferred process for producing a polymer composite containing a biologically compatible material involves first preparing a uniform solution or uniform dispersion comprising the organic monomer(s) that function as the polymerization raw material for the organic polymer (A), the water swelling clay mineral (B) and the biologically compatible material, and then polymerizing the organic monomer(s). The water swelling clay mineral (B), which exfoliates into layers at the nanometer level and is uniformly dispersed throughout the uniform solution, functions as a cross linking agent during polymerization of the water soluble organic monomer(s), forming a three dimensional network structure of the polymer generated from the organic monomer(s) and the clay mineral, with the biopolymer finely incorporated within this three dimensional network structure.

Furthermore, a preferred process for incorporating hydroxyapatite (HAp) as the biologically compatible material into a polymer composite involves forming the polymer composite from the organic polymer (A) and the water swelling clay mineral (B), impregnating this polymer composite with an aqueous solution of an alkali metal phosphate, subsequently impregnating the polymer composite with an aqueous solution of calcium salts, or impregnating the polymer composite with an aqueous solution of calcium salts, subsequently impregnating the polymer composite with an aqueous solution of an alkali metal phosphate, thereby forming a HAp containing polymer composite in which the HAp is formed within the polymer composite, although this is not the only possible production process.

There are no particular restrictions on the proportion of the biologically compatible material relative to the combined total of the organic polymer (A) and the water swelling clay mineral (B), provided the biologically compatible material is able to be finely dispersed through the three dimensional network structure, and the proportion varies depending on the type of biologically compatible material used, and the purpose and intended use of the final product. Specifically, the proportion of the biologically compatible material may fall within a wide range from a concentration of several ppm through to a weight that is several times the combined weight of the organic polymer (A) and the water swelling clay mineral (B), and the actual proportion can be selected in accordance with the functionality and gel dispersibility of the biologically compatible material. Typically the proportion of the biopolymer that represents the biologically compatible material, relative to the combined weight of the organic polymer (A) and the water swelling clay mineral (B), is within a range from 0.1 to 30% by weight, and preferably from 0.5 to 10% by weight. Furthermore, the weight ratio of the biologically compatible inorganic material relative to the organic polymer (A) is preferably within a range from 0.01 to 10, and even more preferably from 0.05 to 5, and most preferably from 0.1 to 3.

The dried product of a polymer composite according to the present invention is uniform and transparent, with no visible aggregation of the water swelling clay mineral, regardless of the clay mineral content. The final water swelling clay mineral content is measured by thermal gravimetric analysis (TGA), and the level of fine dispersibility is measured by inspection using a transmission electron microscope (TEM). In a polymer composite of the present invention, the fact that the entire quantity of the clay mineral is incorporated within the polymer composite can be confirmed by TGA, and the fact that sheet-like layers of clay with thickness values ranging from 1 to several nanometers are dispersed uniformly at the nanometer level can be confirmed by TEM inspection.

The fact that a polymer composite of the present invention displays excellent mechanical properties, including particularly high levels of stretchability and flexibility, even when absolutely no conventional organic cross linking agents are added, confirms that the organic polymer and the finely dispersed clay mineral are interacting to form a three dimensional network structure. In contrast, as can be seen from the comparative examples described below, composites in which a three dimensional network structure is formed by combining a linear polymer containing no water swelling clay mineral with an organic cross linking agent display far inferior mechanical properties when compared with those of polymer composites of the present invention. It is surmised that this finding is due to the fact that the polymer composites of the present invention are forming a three dimensional network structure that is far more effective than anything previously known. Specifically, it is presumed that because the uniformly distributed clay layers function very effectively as polyfunctional cross linking agents, the distance between linkage points can be long, and uniform control becomes possible. Moreover, because the distance between linkage points is long, the polymers bound between these linkage points can adopt a form that is close to a natural chain. The formation of this type of three dimensional network structure comprising an organic polymer and a water swelling clay mineral enables the production of composites with extremely large stretchability and excellent breaking strength.

The formation of this three dimensional network structure can be confirmed not only by the degree of fine dispersion of the water swelling clay mineral, which can be evaluated either by inspection using a transmission electron microscope or by X-ray diffraction measurement, but also by the achievement of the types of superior stretchability and breaking strength values described below, or by measuring a glass transition temperature, using either a dynamic viscoelasticity measurement or measurement by differential scanning calorimetry (DSC), which is close to the free chain value for an organic polymer linked between layers of the water swelling clay mineral.

A polymer composite of the present invention displays excellent mechanical properties. For example, the polymer composite displays breaking elongation of several hundred % through to 3000%, even when the water content is essentially zero, and polymer composites with a breaking elongation exceeding 3000% can also be obtained. Furthermore, a polymer composite of the present invention also displays a much higher breaking strength than a cross linked polymer containing no clay mineral or a linear polymer. Specifically, the tensile strength of the polymer composite is at least 500 kPa, the tensile breaking elongation is at least 200%, and the elastic modulus at a tensile elongation of 100% is at least 50 kPa. Furthermore, a stretched product of the polymer composite can be produced by stretching the polymer composite by at least 100%, and preferably by 100% to 3000%. The thus obtained polymer composite stretched product still retains excellent stretchability (100% to 1500%) even though it has already undergone stretching treatment, and also displays excellent flexibility. Specifically, the polymer composite stretched product has a tensile strength of at least 1000 kPa, a tensile breaking elongation of at least 200%, and an elastic modulus at a tensile elongation of 100% of at least 100 kPa.

In most cases, an unstretched polymer composite of the present invention has a high initial elastic modulus, yield point and necking phenomenon, as well as an extremely high level of stretchability. On the other hand, a stretched product of a polymer composite of the present invention, produced by subjecting an unstretched composite to a stretching treatment, displays excellent stretchability and reversible recovery, and shows favorable flexibility during repeated stretch tests. The stretching of a polymer composite of the present invention is conducted at a temperature equal to, or greater than the glass transition temperature of the organic polymer (A), and can be conducted using conventional methods such as uniaxial stretching, biaxial stretching, rolling or extrusion.

A polymer composite of the present invention displays excellent mechanical properties not only in a dried state, but also in a state where a dried sample has been subjected to moisture absorption. The water content following such moisture absorption varies depending on the individual composition of the polymer composite, and although there are no particular restrictions on the level of this water content, polymer composites with lower water content levels display more stable mechanical properties across a range of atmospheric conditions of differing humidity. Accordingly, the preferred range for the polymer composite water content is no more than 100% by weight, and even more preferably no more than 70% by weight, and most preferably no more than 30% by weight, in an atmosphere at 25° C. and 55% humidity.

A polymer composite of the present invention also displays excellent mechanical properties in a water environment. The equilibrium water absorption displayed by a polymer composite of the present invention immersed in water can also be altered by varying the composition of the polymer composite, and although there are no particular restrictions on the level of this equilibrium water absorption, smaller values are desirable. Specifically, in order to ensure stable mechanical properties, even in water, this equilibrium water absorption in water is typically no more than 500% by weight, and preferably no more than 300% by weight, and even more preferably no more than 100% by weight, and most preferably no more than 50% by weight.

In summary, a polymer composite of the present invention displays excellent ultra-fine dispersion of the water swelling clay mineral across a wide range of clay mineral content values, including high concentrations of the clay mineral, and also displays favorable stretchability and excellent mechanical properties such as strength and elastic modulus. Furthermore, regardless of the actual content within this broad range, the clay mineral is incorporated uniformly throughout the polymer composite, which displays good levels of transparency, particularly when the water content is low. Furthermore, a polymer composite of the present invention can be used stably and displays excellent mechanical properties not only under normal atmospheric conditions, but also in water. In addition, a stretched product of a polymer composite of the present invention displays particularly superior flexibility and bendability, and can be used as a material that displays reversible stretchability and compressability. Furthermore, polymer composites of the present invention and stretched products thereof also offer excellent compatibility with biological materials such as anti-thrombogenic materials. Accordingly, polymer composites of the present invention can be formed into a variety of shapes such as cylinders, rods, films or fibers, and then used in a variety of fields, including as materials for artificial organs such as dialyser, oxgenerator, and artificial blood vessels, as medical treatment materials such as catheters, or as highly elastic industrial materials.

EXAMPLES

As follows is a description of specifics of the present invention based on a series of examples, although the present invention is in no way restricted by the examples presented below.

Example 1

As the water swelling clay mineral, a water swelling synthetic hectorite with the composition $[Mg_{5.34}Li_{0.66}Si_8O_{20}(OH)_4]Na^+_{0.66}$ (trademark Laponite XLG, manufactured by Nihon Silica Corporation) that had been vacuum dried was used. As the acrylate derivative, 2-methoxyethyl acrylate (MEA, manufactured by Wako Pure Chemical Industries Ltd.) was used. The MEA was passed through a silica gel column (manufactured by Merck & Co., Inc.) to remove any polymerization inhibitors prior to use.

Potassium peroxodisulfate (KPS) (manufactured by Kanto Kagaku Co., Ltd.) was used as a polymerization initiator, and was used as an aqueous solution produced by dissolving the potassium peroxodisulfate in pure, deoxygenated water with a KPS/water ratio of 0.40/20 (g/g). N,N,N'N'-tetramethylethylenediamine (TEMED, manufactured by Wako Pure Chemical Industries Ltd.) was used as a catalyst (accelerator). All the pure water used was subjected to thorough bubbling with high purity nitrogen to remove any dissolved oxygen prior to use.

In a 20° C. thermostatic chamber, 19.02 g of pure water was placed in a flat-bottom glass vessel, and 0.16 g of Laponite XLG was added with constant stirring, forming a colorless, transparent solution. To this solution was added 2.86 g of MEA, and stirring was continued to yield a colorless, transparent solution. 1.0 g of the KPS aqueous solution and 16 µl of TEMED were then added with constant stirring. A portion of the resulting solution was transferred to each of three closed-bottom glass tubes with an internal diameter of 5.5 mm and a length of 150 mm, the tubes were sealed with stoppers, and were then left to stand in a 20° C. constant temperature water bath for 20 hours to allow the polymerization to proceed.

The remaining aqueous solution in the flat-bottom glass vessel was also left to stand for 20 hours at 20° C. to allow the polymerization to proceed. All the operations, starting with the preparation of the solution and right through to the polymerization were conducted under a nitrogen atmosphere free from oxygen. After 20 hours, a uniform cylindrically shaped or rod shaped solid had formed in a free state within the water inside the flat-bottom glass vessel and each of the glass tubes respectively.

No non-uniform aggregation of the water swelling clay mineral was observed within the product solids, and each product was a uniform white solid (with a water content of 372% by weight). By subjecting the products to vacuum drying at 100° C. until a constant weight was reached, transparent polymer composites were obtained. The polymerization yield, calculated from the dry weight, was 99.5% by weight. When the dry polymer composite was left to stand for 5 days in an atmosphere at 25° C. and 50% humidity, the water content of the polymer composite was 4.9% by weight. Furthermore, the water absorption when the polymer composite was held in water at 20° C. was 21% by weight. Following drying of the polymer composite, the clay content was determined by conducting thermal gravimetric analysis up to 600° C. (using a TG-DTA220 device, manufactured by Seiko Instruments Inc., conducted under an air stream with a rate of temperature increase of 110° C./minute). The thus determined clay content (inorganic clay/polymer composite) was 6.5% by weight, which is almost identical with the value calculated from the composition of the polymerization solution. Furthermore, Fourier transform infrared spectroscopy (FT-IR) using a KBr method confirmed the presence of peaks consistent with poly(2-methoxyethyl acrylate) (PMEA) and the water swelling clay mineral.

Following embedding of the dry polymer composite in an epoxy resin, an ultra-thin section with a thickness of approximately 50 nm was prepared, and when this section was inspected using a transmission electron microscope (using a JEM-200CX device, manufactured by JEOL Ltd.), sheet-like layers of clay with a thickness of 1 to several nanometers were observed uniformly dispersed throughout the sample. When the dry polymer composite was measured using X-ray diffraction (using a RX-7 device, manufactured by Rigaku Corporation, CuKα radiation), no large peaks were observed at low angles. From the above results it was clear that the solid produced in this example was a polymer composite comprising water swelling clay mineral and PMEA, with a clay content of 6.5% by weight, and with the water swelling clay mineral finely dispersed uniformly throughout the solid. The polymer composite was transparent, and displayed excellent flexibility, not breaking even on bending through 180 degrees at room temperature.

When the dynamic viscoelasticity of one of the dry rod shaped polymer composites was measured using a DMA-200 device manufactured by Seiko Instruments Inc., under conditions including a measurement frequency of 1 Hz and a rate of temperature increase of 2° C./minute, the polymer composite showed a glass transition temperature (Tg: the tan δ peak temperature) at approximately −34° C. At temperatures lower than this Tg value, the composite displayed a high elastic modulus, and at temperatures above the Tg value, the composite displayed an elastic modulus in a range consistent with a stable rubber, across a wide range of temperatures. On the other hand, measurement by differential scanning calorimetry (DSC) (using a DSC-7 device, manufactured by PerkinElmer Inc.) resulted in an identical Tg value of −34° C., and this value is almost identical with the glass transition temperature (−35° C.) measured for a dry linear polymer produced using no clay mineral.

A dry rod shaped polymer composite (cross sectional area 3.40 mm 2) was mounted on a tensile test device (a desktop universal testing machine AGS-H, manufactured by Shimadzu Corporation), taking care to ensure no slipping at the chuck section, and when a tensile test was conducted under conditions including a gauge length of 20 mm and a pull speed of 100 mm/minute, a clear yield point was observed during the initial stretching, and a subsequent necking phenomenon was also observed. The initial elastic modulus was 2.9 MPa, the breaking strength was 3.1 MPa, and the elongation at break was 3200% (the initial cross sectional area was used in each case). The residual deformation of the polymer composite following the tensile test was approximately 100%, indicating a rubber-like flexibility and toughness. Based on these excellent mechanical properties, the fact that rubber-like flexibility could be achieved even though no organic cross linking agent was used, the ultrafine dispersibility of the water swelling clay mineral, and the glass transition temperature of the polymer, it is clear that in this polymer composite of the present invention, the organic polymer (A) and the water swelling clay mineral (B) have formed a three dimensional network structure.

Example 2

The dry polymer composite produced in the example 1 was weighed, and was then allowed to sit in water at 20° C. until the weight stabilized. The equilibrium water absorption (weight of water/weight of dry polymer composite: the water content) at this point was 28% by weight, and this value underwent no further change even after 1 month, or even 6 months, in water. This polymer composite that had reached equilibrium water absorption was a uniform white colored solid, and when a tensile test was conducted in the same manner as the example 1, the results revealed an elastic modulus of 610 kPa, a breaking strength of 325 kPa, and a breaking elongation of 3610%, indicating that even in water, the polymer composite displayed excellent mechanical properties such as stretchability.

Example 3

A sample of the dry polymer produced in the example 1 was subjected to uniaxial stretching to 30 times its original length using the same method as the tensile test described in the example 1, thereby yielding a polymer composite stretched product. The residual deformation on preparation of the polymer composite stretched product was 110%. When a tensile test was conducted on the polymer composite stretched product in the same manner as the example 1, the results revealed an elastic modulus of 1.1 MPa, a breaking strength of 2.9 MPa, and a breaking elongation of 1850%.

The polymer composite stretched product showed a rubber-like flexibility, immediately recovering upon release from the tensile tester and showing a residual deformation of less than 20%. Furthermore, even when the polymer composite stretched product obtained in this example was repeatedly stretched to 1500%, the mechanical properties of the stretched product retained their original values with a good degree of reproducibility.

Example 4

A sample of the dry polymer composite produced in the example 1 was stretched to 30 times its original length in the same manner as the example 3, thereby forming a polymer composite stretched product. When this polymer composite stretched product was allowed to sit in water at 20° C. until the weight stabilized, the resulting equilibrium water absorption (water content) was 28%. This polymer composite was a uniform white colored solid, and when a tensile test was conducted in the same manner as the example 1, the results revealed an elastic modulus of 450 kPa, a breaking strength of 550 kPa, and a breaking elongation of 2800%, indicating that even in water, the stretched polymer composite displayed excellent mechanical properties such as stretchability.

Example 5

With the exceptions of increasing the quantity of Laponite XLG from 0.16 g to 0.32 g, and reducing the quantity of MEA from 2.86 g to 2.6 g, a polymer composite was prepared in the same manner as the example 1. The resulting solid was a uniform composite of the water swelling clay mineral and the polymer, and no non-uniform aggregation of the water swelling clay mineral was observed. A rod shaped sample of the polymer composite was vacuum dried at 100° C. in the same manner as the example 1, yielding a rod shaped transparent polymer composite. Measurement in the same manner as the example 1 revealed a clay content within the polymer composite of 11% by weight. Furthermore, when a tensile test was conducted on the dry, rod shaped polymer composite in the same manner as the example 1, the results revealed both a yield point and a necking phenomenon, as well as an elastic modulus of 2.4 MPa, a breaking strength of 1.4 MPa, and a breaking elongation of 2400%, indicating a polymer composite of superior toughness and flexibility. The polymer composite following the tensile test showed rubber-like flexibility and toughness.

Example 6

The dry polymer composite produced in the example 5 was weighed, and was then allowed to sit in water at 20° C. until the weight stabilized, before the equilibrium water absorption was measured. The equilibrium water absorption (water content) was 50% by weight, and this value underwent no further change even after 1 month, or even 6 months, in water. This polymer composite was a uniform white colored solid, and when a tensile test was conducted in the same manner as the example 1, the results revealed an elastic modulus of 1.4 MPa, a breaking strength of 660 kPa, and a breaking elongation of 3200%, indicating that even in water, the polymer composite displayed excellent mechanical properties such as stretchability.

Example 7

A sample of the dry polymer composite produced in the example 5 was stretched using the same method described in the example 3, thereby yielding a polymer composite stretched product. The residual deformation for the polymer composite stretched product was 105%. When a tensile test was conducted in the same manner as the example 1, the results revealed an elastic modulus of 1.3 MPa, a breaking strength of 4.5 MPa, and a breaking elongation of 1250%. The polymer composite stretched product showed a rubber-like flexibility, immediately recovering upon release from the tensile tester and showing a residual deformation of less than 20%. Furthermore, even when the polymer composite stretched product obtained in this example was repeatedly stretched to 1000%, the mechanical properties of the stretched product retained their original values with a good degree of reproducibility.

Examples 8 to 10

With the exception of increasing the quantity of Laponite XLG used from 0.16 g to one of 0.48 g (the example 8), 0.64 g (the example 9) or 0.8 g (the example 10), polymer composites were prepared using the same polymer composite preparation process described in the example 1. Each of the resulting products was a uniform composite of the water swelling clay mineral and the polymer, and no non-uniform aggregation of the water swelling clay mineral was observed. A rod shaped sample of each polymer composite was vacuum dried at 100° C. in the same manner as the example 1, yielding a rod shaped, transparent, dry polymer composite in each case. Furthermore, tensile tests were conducted on the dry, rod shaped polymer composites in the same manner as the example 1. The results of these tests are shown in Table 1.

Examples 11 to 13

Samples of the dry polymer composites produced in the examples 8 to 10 were subjected to uniaxial stretching to 20 times their original length using the same method as the tensile test described in the example 1, thereby forming polymer composite stretched products. The residual deformation for the polymer composite stretched product of the example 8 was 120%, the value for the polymer composite stretched product of the example 9 was 215%, and the value for the polymer composite stretched product of the example 10 was 205%. Tensile tests were then conducted using these polymer composite stretched products, in the same manner as the example 1 (the examples 11 to 13 respectively). The results are shown in Table 1. Each of the polymer composite stretched products showed a rubber-like flexibility, immediately recovering upon release from the tensile tester and showing a residual deformation of less than 20%. Furthermore, even when the polymer composite stretched products were repeatedly stretched, the mechanical properties of the stretched products retained their original values with a good degree of reproducibility.

TABLE 1

|  | XLG quantity (g) | Elastic modulus (MPa) | Breaking strength (MPa) | Breaking elongation (%) |
| --- | --- | --- | --- | --- |
| Example 8 | 0.48 | 1.8 | 2.3 | 2300 |
| Example 9 | 0.64 | 5.9 | 3.5 | 1150 |
| Example 10 | 0.8 | 9.2 | 4.6 | 1060 |
| Example 11 | 0.48 | 1.5 | 4.2 | 1000 |
| Example 12 | 0.64 | 7.1 | 6.9 | 491 |
| Example 13 | 0.8 | 29.9 | 12.2 | 350 |

Example 14

With the exception of reducing the quantity of MEA used from 2.86 g to 1.3 g, a polymer composite was prepared in the same manner as the example 1. The thus obtained solid was a uniform white color, and no non-uniform aggregation of the water swelling clay mineral was observed. A rod shaped sample of the polymer composite was vacuum dried at 100° C. in the same manner as the example 1, yielding a rod shaped transparent polymer composite. When a tensile test was conducted on the polymer composite in the same manner as the example 1, the results revealed both a yield point and a necking phenomenon, as well as an elastic modulus of 4.7 MPa, a breaking strength of 2.8 MPa, and a breaking elongation of 1610%.

Example 15

With the exception of replacing the 2.86 g of MEA with a mixture of 1.84 g of MEA and 0.4 g of N-isopropylacrylamide (NIPA, manufactured by Kohjin Co., Ltd.), a polymer composite was prepared in the same manner as the example 1. The thus obtained solid was a uniform polymer composite comprising the water swelling clay mineral and a copolymer, and no non-uniform aggregation of the water swelling clay mineral was observed. A rod shaped sample of the polymer composite was vacuum dried at 100° C. in the same manner as the example 1, yielding a rod shaped transparent polymer composite. Measurement in the same manner as the example 1 revealed a clay content within the polymer composite of 14.9% by weight. Furthermore, when a tensile test was conducted on the dry, rod shaped polymer composite in the same manner as the example 1, the results revealed both a yield point and a necking phenomenon, as well as an elastic modulus of 4.81 MPa, a breaking strength of 4.55 MPa, and a breaking elongation of 700%, indicating a polymer composite of superior toughness and flexibility. The polymer composite following the tensile test showed rubber-like flexibility and toughness.

Example 16

The dry polymer composite produced in the example 15 was allowed to absorb water until the weight stabilized, in a similar manner to the example 2, thus yielding a uniform white colored polymer composite. The equilibrium water absorption (water content) at this point was 135% by weight. When a tensile test was conducted on this polymer composite that had reached equilibrium water absorption, the results revealed no yield point, an elastic modulus of 1.81 MPa, a breaking strength of 72.4 kPa, and a breaking elongation of 2700%.

Example 17

A sample of the rod shaped polymer produced in the example 15 was stretched to 5 times its original length using the same method described in the example 3, thereby forming a polymer composite stretched product. The residual deformation for the polymer composite stretched product was 105%. When a tensile test was conducted in the same manner as the example 1, the results revealed an elastic modulus of 3.4 MPa, a breaking strength of 10.4 MPa, and a breaking elongation of 288%. The polymer composite stretched product following tensile testing showed a rubber-like flexibility and toughness, with a residual deformation of less than 20%. Furthermore, even when the polymer composite stretched product was repeatedly stretched, the mechanical properties of the stretched product retained their original values with a good degree of reproducibility.

Example 18

With the exception of replacing the 2.6 g of MEA with a mixture of 2.08 g of MEA and 0.34 g of methacrylamide (manufactured by Aldrich Chemical Company Inc.), a polymer composite was prepared in the same manner as the example 5. The thus obtained solid was a uniform polymer composite comprising the water swelling clay mineral and a copolymer, and no non-uniform aggregation of the water swelling clay mineral was observed. A rod shaped sample of the polymer composite was vacuum dried at 100° C. in the same manner as the example 1, yielding a rod shaped transparent polymer composite. This dry polymer composite was allowed to absorb water until the weight stabilized, in a similar manner to the example 2, thus yielding a uniform white colored polymer composite. The equilibrium water absorption (water content) of the polymer composite was 60% by weight.

Example 19

With the exceptions of not adding the TEMED, and altering the polymerization temperature to 50° C., a polymer composite was prepared in the same manner as the example 1. The thus obtained solid was a uniform white color, and no non-uniform aggregation was observed. The water content of the polymer composite immediately following polymerization, calculated from the dry weight determined below, was 615% by weight. A rod shaped sample of the polymer composite was vacuum dried at 100° C. in the same manner as the example 1, yielding a rod shaped transparent polymer composite. When a tensile test was conducted on the polymer composite in the same manner as the example 1, the results revealed no yield point, an elastic modulus of 1.8 MPa, a breaking strength of 1.1 MPa, and a breaking elongation of 1210%, which represent an extremely high elastic modulus and breaking elongation. The polymer composite following tensile testing displayed rubber-like flexibility and toughness.

Example 20

With the exception of adding 0.028 g of N,N'-methylenebisacrylamide (manufactured by Wako Pure Chemical Industries Ltd.) following addition of the Laponite XLG, a polymer composite was prepared in the same manner as the example 1. The thus obtained solid was a uniform white color, and no non-uniform aggregation was observed. A rod shaped sample of the solid was vacuum dried at 100° C. in the same manner as the example 1, yielding a rod shaped transparent polymer composite. When a tensile test was conducted on this polymer composite in the same manner as the example 1, the results revealed no yield point, an elastic modulus of 3.8 MPa, a breaking strength of 1.8 MPa, and a breaking elongation of 410%, which represent an extremely high elastic modulus and breaking elongation. The polymer composite following tensile testing displayed rubber-like flexibility and toughness.

Example 21

In a 20° C. thermostatic chamber, 19.02° g of pure water was placed in a flat-bottom glass vessel, and 0.396 g of Laponite XLG was added with constant stirring, forming a colorless, transparent solution. To this solution was added 2.5 g of ethanol and 0.2 g of tetrahydrofuran, and following further stirring, 2.54 g of 2-ethoxyethyl acrylate (manufactured by Aldrich Chemical Company Inc.) was added and stirring was continued to yield a colorless, transparent solution. 1.0 g of the KPS aqueous solution and 16 µl of TEMED were then added with constant stirring. A portion of the resulting solution was transferred to each of three closed-bottom glass tubes with an internal diameter of 5.5 mm and a length of 150 mm, the tubes were sealed with stoppers, and were then left to stand in a 20° C. constant temperature water bath for 20 hours to allow the polymerization to proceed.

The remaining aqueous solution in the flat-bottom glass vessel was also left to stand for 20 hours at 20° C. to allow the polymerization to proceed. All the operations, starting with the preparation of the solution and right through to the polymerization were conducted under a nitrogen atmosphere free from oxygen. After 20 hours, a uniform, white colored, cylindrically shaped or rod shaped solid (polymer composite) had formed in the water inside the flat-bottom glass vessel and each of the glass tubes respectively. These solids were carefully removed from each vessel. The resulting solids were uniform polymer composites of the water swelling clay mineral and the polymer, and no non-uniform aggregation of the water swelling clay mineral was observed. A rod shaped sample of the polymer composite was vacuum dried at 100° C. in the same manner as the example 1, yielding a rod shaped transparent polymer composite with good flexibility. When the thus obtained dry polymer composite was allowed to absorb water until the weight stabilized, in a similar manner to the example 2, a uniform white colored polymer composite was obtained. The equilibrium water absorption (water content) of this polymer composite was 50% by weight.

Example 22

With the exception of replacing the 2.54 g of 2-ethoxyethyl acrylate with 2.80 g of 2-ethoxyethyl methacrylate (manufactured by Wako Pure Chemical Industries Ltd.), a polymer composite was prepared in the same manner as the example 21. The resulting solid was a uniform white colored polymer composite of the water swelling clay mineral and the polymer, and no non-uniform aggregation of the water swelling clay mineral was observed. A rod shaped sample of the polymer composite was vacuum dried at 100° C. in the same manner as the example 1, yielding a rod shaped transparent polymer composite with good flexibility. When the thus obtained dry polymer composite was allowed to absorb water until the weight stabilized, in a similar manner to the example 2, a uniform white colored polymer composite was obtained. The equilibrium water absorption (water content) of this polymer composite was 40% by weight.

Comparative Example 1

With the exception of not using the water swelling clay mineral, polymerization at 20° C. was conducted for 20 hours in the same manner as the example 1, and yielded a cloudy-white solid polymer. The polymer was pliant but extremely brittle, and displayed very strong adhesion to glass, meaning that when attempts were made to remove the polymer from the glass tubes or the flat bottom glass vessel, separation became a problem, and this soon resulted in rupture of the polymer solid. Furthermore, a rod shaped polymer prepared in one of the glass tubes was vacuum dried at 100° C., and a dried rod shaped sample was obtained, although even after drying, the product remained adhered to the glass, separation was problematic, and the dry product was prone to rupture. Accordingly, tensile tests could not be conducted on either the initial polymer product or the dried product.

Comparative Example 2

With the exceptions of not using the water swelling clay mineral, and following addition of the MEA adding an organic cross linking agent in a quantity equivalent to 3 mol % of the MEA, polymerization at 20° C. was conducted for 20 hours in the same manner as the example 1, yielding an organic cross linked MEA polymer. Neat N,N'-methylenebisacrylamide was used as the organic cross linking agent. The result was a cloudy-white, brittle, water containing gel. This gel was pliant but extremely brittle, and displayed very strong adhesion to glass, meaning that when attempts were made to remove the polymer from the glass tubes or the flat bottom glass vessel, separation became a problem, and this soon resulted in rupture of the polymer solid. Furthermore, a rod shaped polymer prepared in one of the glass tubes was vacuum dried at 100° C., and a dried rod shaped sample was obtained, although even after drying, the product remained adhered to the glass, separation was problematic, and the dry product was prone to rupture. Accordingly, tensile tests could not be conducted on either the water containing gel or the dried product.

Comparative Example 3

With the exceptions of using a plastic vessel made of polyamide resin, and adding a quantity of N,N'-methylenebisacrylamide equivalent to 1 mol % of the MEA, an organic cross linked MEA polymer was prepared in the same manner as the comparative example 2. The product was carefully removed from the vessel, and dried to form a rod shaped sample. A tensile test was conducted in the same manner as the example 1, with care taken not to damage the sample at the point of attachment. The results revealed a breaking elongation of 180% and a breaking load of 0.7 N, which represent significantly inferior mechanical properties to those observed in the examples. Furthermore, the breaking load for a 150% stretched product was also 0.7 N.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description.

What is claimed is:
1. A polymer composite comprising:
   an organic polymer (A) comprising either a polymer produced from a water soluble (meth)acrylate ester (a), or a copolymer produced from a water soluble (meth)acrylate ester (a) and at least one compound selected from a group consisting of (meth)acrylamide and N-substituted (meth)acrylamides (b); and
   a water swelling clay mineral (B);
   wherein the organic polymer (A) and the water swelling clay mineral (B) interact to form a three dimensional network structure; and said water soluble (meth)acrylate ester (a) is at least one compound selected from a group consisting of methoxyethyl acrylate, ethoxyethylacrylate, methoxyethyl methacrylate and ethoxyethyl methacrylate.

2. A polymer composite comprising:

an organic polymer (A) comprising either a polymer produced from a water soluble (meth)acrylate ester (a), or a copolymer produced from a water soluble (meth) acrylate ester (a) and at least one compound selected from a group consisting of (meth)acrylamide and N-substituted (meth)acrylamides (b); and a water swelling clay mineral (B);

wherein the organic polymer (A) and the water swelling clay mineral (B) interact to form a three dimensional network structure; and said organic polymer (A) is a copolymer of a water soluble (meth)acrylate ester (a) and at least one compound selected from a group consisting of(meth)acrylamide and N-substituted (meth)acrylamides (b), and a molar ratio of (b)/(a) within said copolymer is no more than 1.

3. A polymer composite comprising:

an organic polymer (A) comprising either a polymer produced from a water soluble (meth)acrylate ester (a), or a copolymer produced from a water soluble (meth) acrylate ester (a) and at least one compound selected from a group consisting of (meth)acrylamide and N-substituted (meth)acrylamides (b); and a water swelling clay mineral (B);

wherein the organic polymer (A) and the water swelling clay mineral (B) interact to form a three dimensional network structure; and a tensile strength of said polymer composite is at least 500 kPa, a tensile breaking elongation is at least 200%, and an elastic modulus at a tensile elongation of 100% is at least 50 kPa.

4. A stretched product of a polymer composite produced by stretching a polymer composite according to any one of claim 1 through claim 3, wherein a tensile strength of said stretched product is at least 1000 kPa, a tensile breaking elongation is at least 200%, and an elastic modulus at a tensile elongation of 100% is at least 100 kPa.

* * * * *